Feb. 28, 1967   O. C. HOLDERER   3,306,101
COMPOSITE FORCE MEASURING ASSEMBLY
Filed Dec. 2, 1964

Oscar C. Holderer,
INVENTOR.

BY Harry M. Saragovitz
Edward J. Kelly
Herbert Berl
ATTORNEYS J. Keith Fowler

United States Patent Office 3,306,101
Patented Feb. 28, 1967

3,306,101
COMPOSITE FORCE MEASURING ASSEMBLY
Oscar C. Holderer, Huntsville, Ala., assignor to the United States of America as represented by the Secretary of the Army
Filed Dec. 2, 1964, Ser. No. 415,545
5 Claims. (Cl. 73—147)

The invention described herein may be manufactured and used by or for the Government for governmental purposes without the payment of any royalty thereon.

This invention relates to an improved force-measuring assembly for use, for example, in wind tunnel models, and more particularly to an improved force-measuring assembly which is composite in construction so as to allow interchangeability of separate parts thereof.

The invention relates generally to a force-measuring assembly of the type wherein a force-measuring instrument or balance is supported within a model as an intermediate member interconnecting the model and a support sting carried by a wind tunnel support or wall. Particularly, this invention provides means for facilitating interchangeability of different, separable elements of a composite assembly; namely, the model, the balance or balances, and the support sting.

According to current practice, wherein the elements of an assembly of the aforementioned type are normally integrally formed or otherwise made inseparable, the entire assembly must be mounted and dismounted in the wind tunnel when different instruments or balances are required to obtain varying tests results. This practice consumes a large amount of valuable wind tunnel time. In addition, the cost of producing such force-measuring assemblies is necessarily high because of intricate machining and other involved metal working processes. This cost is greatly amplified wherein models used in testing are of the slender, small-diameter type, since the formation of the finite force-measuring assembly becomes quite tedious and time-consuming.

Experimental aerodynamics deals with the empirical determination of flight parameters for air-traversing vehicles such as aircraft, missiles, shells, etc. Based on known laws of aerodynamics, it is possible to arrive at these parameters from experiments with reduced-scale models. Most conveniently, airflow is simulated in a wind tunnel while a model is held stationary therein. Usually a wind tunnel is equipped with a model supporting device, commonly referred to as a "sting" in wind tunnel parlance, by which the models' attitude in relation to the airstream can be changed. The principal object of such tests is to measure the force or force components exerted on the model by the moving air. The particular system or balance assembly most suited to perform these measurements varies greatly with test conditions, geometrical restrictions, personal preference and convention. For example, for high speed test facilities, the most favored and the most commonly used tool is the internal straingage type balance. While the present invention is not intended to be limited to one particular type of measuring device, an internal straingage type balance is preferred. A common functional objective of this type balance is to sense specific force components selectively. Thus, in the cartesian system of reference, it is conventional to resolve the force vector into the following six components: normal force, pitching moment, side force, yawing moment, axial force (drag), and roll. Depending on the test objectives and conditions, all six components may be measured simultaneously or one or several may be singled out. Hence, a two-component or a three-component balance, etc., may be desirable. In testing symmetrical missile bodies, for instance, a three-component balance, i.e., a balance measuring normal force, pitching moment and axial forces (drag), suffices. Thus, the symmetrical geometry of such shapes and the absence of fins or rudders obviates the measurement of roll, side force and yawing moment.

It is believed necessary to briefly state herein some fundamental, functional and design aspects of straingage balances. Thus, a strain gage as referred to herein is understood to be an electrically conductive element whose resistance changes in proportion to a strain applied to it. For example, a commercially available wire grid type or a well known semi-conductor type straingage is commonly used in balance work, preferably in an arrangement of four such gages interconnected to form a Wheatstone bridge circuit. The primary design objective for the structural elements of the balance proper is to devise shapes with suitable stress concentrations in such a manner that an electrical signal from the gages cemented to the regions of high stress concentration will be responsive to the particular force component which is to be measured and, equally important, at the same time be nonresponsive to other force components. This objective can be reached partially by the proper choice of balance geometry and partially by taking advantage of the well known phenomenon that in a Wheatstone bridge circuit certain symmetrical changes in the four legs of the bridge do not produce an unbalance, presupposing compatible design. Thus, it is possible to interconnect the four gages belonging to one such circuit so that resistive changes in the individual gages due to spurious force components are cancelled. Regarding the geometry of the balance, many shapes and variations in detail have been evolved for specific purposes. For instance, some of the better known schemes in the art are: the moment flexures (to measure pitching and yawing moments), the duplex arrangement of moment flexures (to measure normal force and side force), the parallelogram flexure (to measure normal force, side force, drag), the cruciform flexure (to measure rolling moments) etc.

Hence, it is apparent that an infinite number of combinations are possible. The time required to produce a particular force-measuring assembly, according to current practice, is directly dependent on the desired number of balance components. Consequently, the cost of production is likewise effected. For these reasons, the supply of on-hand force-measuring assemblies in a wind tunnel installation is sometimes limited. Since the efficiency and versatility of a particular wind tunnel operation is directly dependent on the on-hand stock of force-measuring units, the present inventive concept allowing separability and interchangeability of parts greatly increases this efficiency.

As stated hereinabove, the present invention is not intended to be limited to any specific balance, thus, the foregoing general background and partial enumeration of design configurations should suffice. However, it should be clear from the foregoing discussion that a virtually infinite variety of combinations exists, especially, if it is considered that each one of the balance elements can be designed for only one specific range of optimum response and compatibility to spurious force components. For example, if a great variety of model shapes are to be tested over a wide range of air speed and pressure, it is required that a large number of balances be provided for best results to be obtained. Obviously, a very strong, insensitive balance could be used for test conditions where only 10%, for example, of design sensitivity is utilized, but a person familiar with measuring techniques would be readily aware that such practice yields doubtful and impractical results. Thus, since internal straingage balances are costly and time-consuming to build, it is desirable to attain the utmost in versatility and range of application.

Accordingly, in view of the foregoing, the primary object of the present invention is to provide a composite force-measuring assembly for use in wind tunnels, or the like test facilities, which assembly provides means for facilitating interchangeability of different, separable force-measuring balances or instruments therewith.

Another object of the invention is to provide means for interchangeably utilizing different, separable balance devices with the feature wherein means is provided for varying the relative position of a balance along the longitudinal axis of a model.

A further object of the invention is to provide a composite force-measuring assembly with the feature permitting the use of a single balance or a plurality of balances arranged serially in juxtaposition within a hollow model.

A still further object of the invention resides in the provision of a separable, three-component balance device which is particularly adapted for use within the force-measuring assembly according to the invention wherein separable connections are provided.

An important feature of the invention resides in the provision of structure which allows assembly of a great variety of balances from a limited number of balance and connective elements.

The foregoing and other objects and features of the invention will become apparent from the following detailed description of exemplary structure embodying the invention and from the accompanying drawings, in which.

Figure 1:
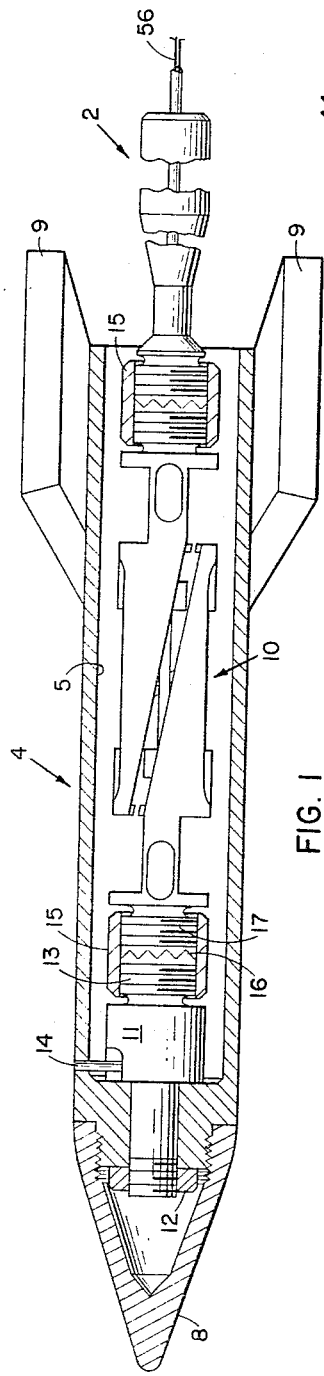
FIGURE 1 is an elevation view, partially in section, of a composite force-measuring assembly according to the invention.

As illustrated in the drawings, FIGURE 1, the invention broadly comprises: a support element or "sting" 2 that is fixed relative to a wind tunnel support (not shown); a wind tunnel model body 4 provided with a hollow or bore 5 which is open toward the after or downstream end thereof; and typical multi-component, force-measuring balance device 10 co-axially oriented and concentrically disposed within bore 5 of the model body and connected at its fore and after ends with elements 4 and 2, respectively.

Referring more particularly to the drawings, FIGURE 1, model body 4 is provided at its forward or upstream end with a removable-shell, nose section 8 and on its after or downstream end with stabilizing fins 9. To provide means for detachably securing the forward end of balance device 10 within the forward end of model 4, an adapter element 11 is provided. The adapter element is detachably secured at one end within the forward end of the model as by lock nut 12. The opposite end of the adapter has an externally threaded projection 13 which terminates in V-shaped, radial, clutch teeth 16, commonly referred to as "Hirth" teeth. The forward end of balance device 10 is provided with an externally threaded projection 17 having equal diameter to that of adapter projection 13. Projection 17 terminates in "Hirth" teeth which are complementary to teeth 16 of the adapter element. The threaded portion on the balance projection is preferably provided with a left hand thread. To readily connect elements 10 and 11 when the same are placed with their adjacent ends in juxtaposition, as shown in FIGURE 1, nut 15 is provided. This nut is conveniently formed with matching right and left hand internal threads. Thus, this nut functions as a turnbuckle; since, when the nut is wrenched tight, the same will force the complementary clutch teeth into mutual engagement and thereby provide for a strong, rotationally locked joint. It is noted that the opposite or downstream end of balance 10 is detachably connected to the forward end of support sting 2 by a connecting joint identical in detail to the described joint at the forward end thereof. Thus, adjacent parts in varying number may be indexed to each other as desired and rotational alignment is automatic. To prevent rotation of the adapter and to maintain proper orientation, a locking device in the form of a pin 14 is slidably disposed for engagement within aligned, cooperating apertures in adapter 11 and model body 4.

Figure 2:
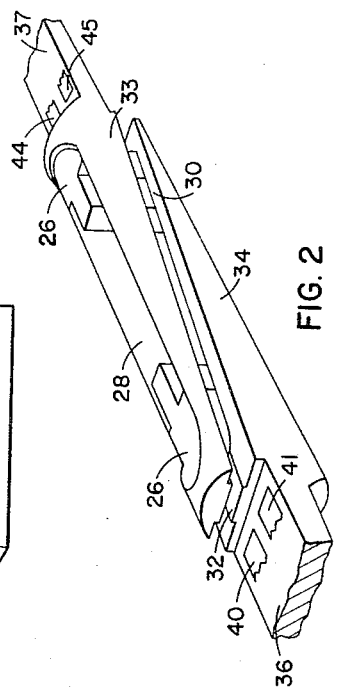
FIGURE 2 is a perspective view of a typical balance device utilized in a composite force-measuring assembly according to the invention.
Figure 3:
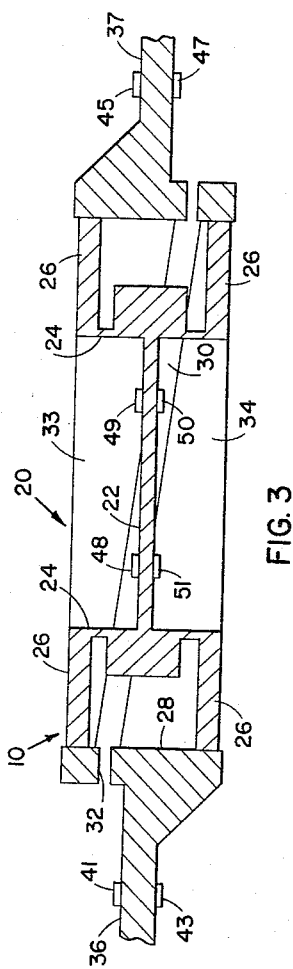
FIGURE 3 is a partial cross-section taken in a vertical plane along the longitudinal axis of the balance device of FIGURES 1 and 2, depicting a drag link in secured position within the balance.

While the invention is not intended to be limted to a particular type of balance device or to the use of a particular number of such devices, a preferred balance device 10 is illustrated in FIGURES 2 and 3. This balance device is provided with an H-frame drag link 20, see FIGURE 3. The drag link is secured within an axial slot 28 provided in the balance body. The H-frame drag link comprises a horizontally disposed, axially oriented cross-beam 22 and two upright legs or normally oriented beams 24, these beams together forming a figure H construction. Each of the upright beams is provided on its opposite end with axially outwardly extending, horizontally disposed extensions or appendages 26. These appendages are of equal width to slot 28 for securement, as by welding, therewithin. Diagonal sawcuts 30 and lateral sawcuts 32 are provided in the balance body. Since these sawcuts extend inwardly of the balance body to the extent of slot 28, the balance body is divided into two separate, part-cylindrical parts 33, 34 which are held together solely by the securement of the appendages to the body at the axially opposite ends of slot 28. Moment flexures are provided near each end of the balance device by reduced portions 36, 37 of the balance body. Thus, it is apparent that a balance device has been provided which is particularly adapted for use in a composite assembly wherein separable connections as described hereinabove are used. This is so because of the inseparable connection of the drag link with the balance body in fabrication thereof. Thus, pin and bolt connections within the balance device are eliminated, which connections are inherently undesirable inasmuch as they are often the source of hysterisis and zero shift. Also, the elimination of the latter such connections, which are necessarily restrictive as to space requirements, allows for miniaturization. A balance device built in accordance with the present invention may, for example, have a diameter substantially less than one-half inch. It is also apparent that the balance may be more compact in length by fabrication in the described manner, eliminating commonly used, undesirable pinned and bolted connections of the parts within the balance device.

To provide means for measuring forces or force components exerted on a model, commercially available straingages are cemented in the desired locations within the balance device. In the preferred embodiment, for example, straingages 40, 41, 42 and 43 are secured on forward moment flexure 36; straingages 44, 45, 46 and 47 are applied to rearward moment flexure 37; and straingages 48, 49, 50 and 51 are secured to horizontally disposed, cross-beam 22 of the H-frame drag link. It is seen that, since cross-beam 22 and moment flexures 36 and 37 to which the various straingages are applied are oriented in the longitudinal or axial direction of the balance body, the balance diameter incurs no restriction on the available space for mounting the gages.

Figure 4:
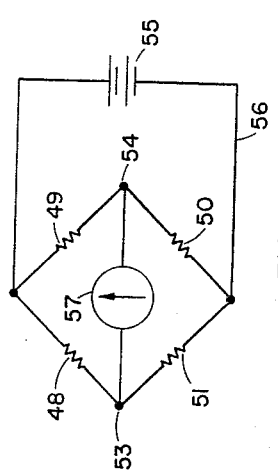
FIGURE 4 illustrates a typical schematic diagram for the electrical connection of straingages carried by the balance device.

The straingages which are utilized herein may, for example, be of the common wire grid type or the semi-conductor type, wherein the resistance of an electrically conductive element changes in proportional to a strain applied thereto. A typical schematic diagram for the electrical interconnection of straingages 48, 49, 50 and 51 of H-frame drag link member 22 is depicted in FIGURE 4. Thus, in operation, a battery 55 or other electrical source supplies a voltage as by wire means 56 to junctions 53, 54 between gages 48, 49, 50 and 51. A sensitive galvanometer 57, or other suitable instrument, indicates the electrical potential between junctions 53 and 54, for example.

In operation of the balance device mounted within a model, as shown in FIGURE 1 and described hereinabove, when an axial force, for instance, is applied to the model, beam 22 deflects since the latter is subjected to bending stresses. In particular, the stress at the surface of beam 22 adjacent straingages 48 and 50 is a compressive stress while the surface of beam 22 adjacent gages 49 and 51 is stressed in tension. These stresses are proportional to the applied axial force, and, therefore, the resistive change of the straingages provides measuring means for determining the applied, axial force. While axial (drag) forces are measured by the H-frame drag link arrangement, normal forces and bending moments may be simultaneously measured by use of the straingages on moment flexures 36, 37. From the generally known function of a Wheatstone bridge circuit, exemplified in FIGURE 4, it is evident that the deflection of galvanometer 57 is proportional to the intensity of the applied axial force on gaged member 22.

While the described balance device is preferred, it is not to be construed as limiting the scope of application or the structural detail of the invention. Thus, any balance device may be used which is provided with interconnecting joint means so as to allow interchangeability as aforedescribed. Adapter device 11 further allows versatility in the composite assembly since the same may be used as a spacer for positioning a balance or a plurality of balances arranged serially in a desired location with respect to the model along the longitudinal axis thereof. The length of the sting determines the model's location in the wind tunnel relative to the support mechanism. Inasmuch as the region of optimum flow in a wind tunnel, i.e., the region with the smoothest and least disturbed flow, is often at variance with flow velocity, the removable sting and its substitution by shorter or longer versions renders the entire assembly more adaptable to changing test requirements.

Another important aspect of the invention resides in the feature of the interchangeability of stings. Since there hardly any two wind tunnels in operation which have the same chucking system, therefore, if balances are to be used at different installations the problem of sting adaptation is critical. With the present removable sting, quick adaptation without intermediate devices is facilitated. While the sting end shown is cylindrical, tapered, flanged, shouldered or otherwise modified stings may be quickly assembled to the balance device to accommodate the respective wind tunnel.

From the foregoing, it will be seen that an improved force-measuring assembly is provided which is composite in construction, thus, allowing flexibility and a wide variance of combinations of elements. Interchangeability of the three major elements, i.e., the model, the balance or force-measuring instrument and the sting, is accommodated. Thus, quick disconnect type joints are provided for interconnecting the separable elements so as to facilitate interchangeability of these elements. Further, a preferred embodiment of an internal straingage balance device is described, which device is simple in construction, easily assembled, which is not affected appreciably by extraneous forces, and which device is particularly adapted for use with elongated, slender, small-diameter models.

The above description shall not be construed as limiting the scope of application or the structural detail of the invention. For instance, the principles may be applied to devices other than wind tunnel test facilities, e.g., accelerometers, loading mechanism, etc.

It is to be understood that the specific embodiment of the invention described is merely illustrative of the principles of the invention and that various changes and modifications may be made without departing from the spirit and scope of the invention as set forth in the appended claims.

I claim:
1. A composite, force-measuring assembly comprising, in combination:
 (a) a wind tunnel support sting;
 (b) first connecting means on the forward end of said support sting;
 (c) a wind tunnel model adapted to be supported from the forward end of said support sting, said model including an elongated body having a removable nose portion on the forward end thereof and having a hollowed portion opening to the opposite, rearward end thereof;
 (d) second connecting means within the forward end of said hollowed portion of the model;
 (e) a separable, force-measuring device adapted to be disposed within said hollowed portion of the model body;
 (f) third connecting means provided on one end of said force-measuring device;
 (g) fourth connecting means provided on the opposite end of said force-measuring device;
 (h) said first and second connecting means being adapted for interconnection with either of said third and fourth connecting means so as to allow interchangeability of different, force-measuring devices and models with respect to said support sting;
 (i) said separable, force-measuring device being defined by a drag balance for measuring drag forces developed on the external surface of said model, said balance comprising,
  (1) an elongated body member having a longitudinal, axially extending slot formed in the midportion thereof,
  (2) an H-shaped drag link disposed in said slot, said link including a pair of spaced-apart, parallel, upright legs and a horizontally disposed, center beam connected at its opposite ends to the respective midportion of said upright legs, said beam being readily influenced by bending force imposed thereon, the opposite ends of each of the upright legs being rigidly secured to the elongated body member at the opposite ends of said slot, and
  (3) strain gages secured on opposite sides of said center beam and in close proximity to said upright legs whereby a force applied in the approximate direction axially of the center beam, subjecting said beam to bending stresses, may be measured.

2. A composite, force-measuring assembly according to claim 1, wherein a plurality of separable force-measuring devices are utilized, each of said devices having similar connecting means on the respective, opposite ends thereof, whereby said devices may be interconnected in end-to-end relation within said model.

3. A composite, force-measuring assembly as defined by claim 1, wherein said second connecting means includes:
 (a) an elongated adapter device, said adapter device having its forward end attachably secured within the forward end of the hollowed portion of said model and having an externally threaded protrusion on the opposite end thereof; and
 (b) an elongated nut for interconnecting said protrusion and the juxtaposed, forward end of said force-measuring device.

4. A composite, force-measuring assembly comprising, in combination:
(a) a wind tunnel support sting;
(b) first connecting means on the forward end of said support sting;
(c) a wind tunnel model adapted to be supported from the forward end of said support sting, said model including an elongated body having a removable nose portion on the forward end thereof and having a hollowed portion opening to the opposite, rearward end thereof;
(d) second connecting means within the forward end of said hollowed portion of the model;
(e) a separable, force-measuring device adapted to be disposed within said hollowed portion of the model body;
(f) third connecting means provided on one end of said force-measuring device;
(g) fourth connecting means provided on the opposite end of said force-measuring device;
(h) said first and second connecting means being adapted for interconnection with either of said third or fourth connecting means so as to allow interchangeability of different, force-measuring devices and models with respect to said support sting;
(i) said second connecting means including,
  (1) an elongated adapter element having its forward end attachably secured within the forward end of the hollowed portion of said model and having an externally threaded protrusion on the opposite end thereof, and
  (2) an elongated nut for interconnecting said protrusion and the juxtaposed, forward end of said force-measuring device; and
(j) wherein said protrusion is provided with right-hand threads, the forward end of said force-measuring device is provided with left-hand threads, and the nut is provided with corresponding, oppositely directed threads.

5. A composite, force-measuring assembly as defined by claim 2, wherein radial, clutch teeth are provided on the juxtaposed end faces of the adapter and the force-measuring device whereby the adapter and force-measuring device are positively secured against relative rotation when the corresponding clutch teeth are in interlocking engagement.

References Cited by the Examiner
UNITED STATES PATENTS 2,865,200 12/1958 Gieseler _____ 73—147
2,909,061 10/1959 Gelbach et al. _____ 73—147

DAVID SCHONBERG, *Primary Examiner.*